(No Model.)
W. E. BUDD.
SULKY PLOW.
No. 346,801. Patented Aug. 3, 1886.
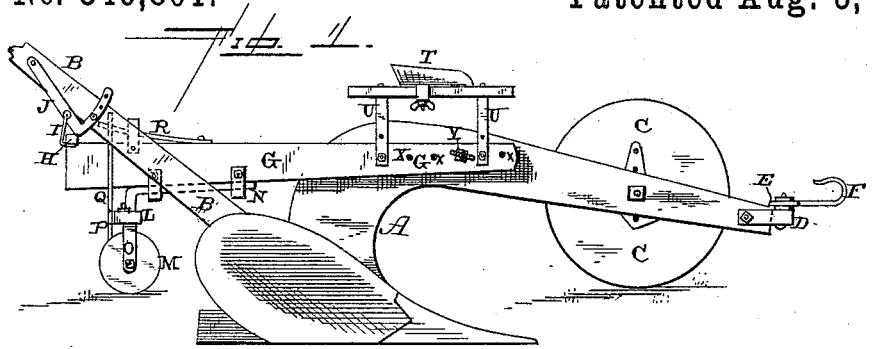
Fig. 1.
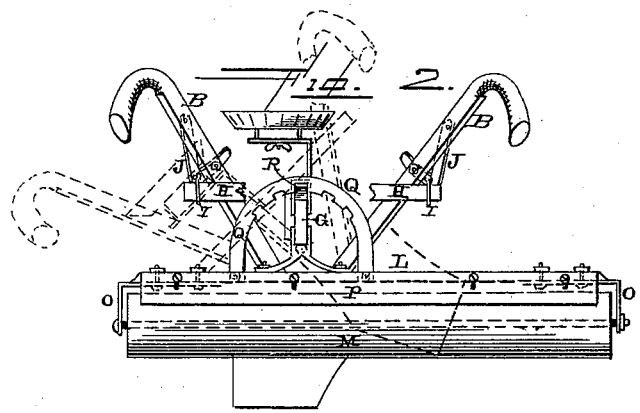
Fig. 2.
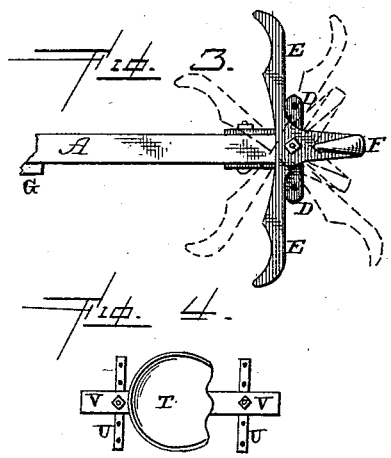
Fig. 3.
Fig. 4.
Witnesses:
Louis J. Gardner
L. S. Burket.
Inventor:
W. E. Budd,
per J. A. Lehmann,
Atty

UNITED STATES PATENT OFFICE.

WILLIAM E. BUDD, OF CHATHAM, NEW JERSEY, ASSIGNOR OF ONE-THIRD TO FREDERICK HUSSEY, OF NEW YORK, N. Y.

SULKY-PLOW.

SPECIFICATION forming part of Letters Patent No. 346,801, dated August 3, 1886.

Application filed November 13, 1885. Serial No. 182,707. (No model.)

*To all whom it may concern:*

Be it known that I, WILLIAM E. BUDD, of Chatham, in the county of Morris and State of New Jersey, have invented certain new and useful Improvements in Sulky-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in sulky-plows; and it consists in, first, the combination of a plow of any suitable construction, a wheel attached near the front end of its beam a bar which is pivoted to the side of the beam and which has a roller connected to its rear end, the plow being supported between the wheel and the roller, so as to regulate the depth of the furrow; second, the combination of a plow of suitable construction, a bar pivoted to the beam of the plow and carrying a long roller which is placed at right angles to the beam and which bears both upon the plowed and unplowed land across the furrow and which prevents the plow from upsetting; third, the combination of a plow of any suitable construction, a bar which is pivoted to the beam of the plow, a long roller which extends at right angles to the beam of the plow, a notched brace connected to the frame of the roller, and a suitable catch on the bar to engage with the notches of the brace, so as to regulate the angle at which the plow shall be turned; fourth, an attachment for plows, as will be more fully described hereinafter, whereby the driver can either ride upon the attachment of the plow or walk along by side of the horses, and the plow will continue to turn a furrow without any further attention on his part.

The object of my invention is to construct an attachment for plows of ordinary construction, whereby the plow is prevented from upsetting; to enable the driver to walk along by the side of the horses while the plow takes care of itself, or to ride and control the width of the furrow by means of his feet, as he may prefer, and to provide a roller which, while it prevents the plow from upsetting, it at the same time helps to regulate the depth of the furrow and to roll the furrow which has just been turned up, giving the plowed land the appearance of having been thoroughly rolled.

Figure 1 is a side elevation of a plow embodying my invention. Fig. 2 is a rear view of the same. Fig. 3 is a detail view showing the attachment to the front end of the plow-beam for controlling the width of the furrows. Fig. 4 is a detail view showing the attachment of the seat.

A represents an ordinary plow, of any desired construction, which is provided with handles B and the wheel C near the front end of its beam. To the front end of the beam is attached the ordinary clevis, D, and the cross-bar E, upon which the driver places his feet for the purpose of changing the line of draft in order to make the plow turn a wider or narrower furrow, as may be preferred. This cross-bar extends at right angles to the beam of the plow, and has the draft-hook F secured thereto. The driver's feet resting upon this bar, which is pivoted upon the top of the beam, enables the bar to be turned partially around upon its pivot in either direction, as shown in dotted lines in Fig. 3, so as to change the line of draft, and thus cause the plow to cut a wider or narrower furrow, as may be preferred.

Pivoted to the side of the plow-beam at any desired point is a rod or bar, G, which has a rising and falling motion at its rear end when left free to move, and which extends backward in a line with the beam any desired distance. The vertical movement of this bar G is controlled by the cross-bar H, which bar H is adjusted vertically by means of the hooks I and the perforated angle-bars J. These angle-bars J are pivoted to the handles B of the plow and can be adjusted by changing the bolts, which secure the bars to the sides of the handles, from one hole to another, and thus either force the cross-bar H downward, or raise it up, as may be desired.

Pivoted to the under side of the bar G is the roller-frame L, in which is journaled the roller M. This roller-frame L has its pivot N to project along upon the under side of the bar G, to which it is secured by bearings or castings of any kind. The roller-frame consists of a cross-bar of wood, to the ends of which the angle-arms O are secured, and through which angle-arms the journal for the roller is passed. Secured to the rear edge of the frame is a scraper, P, which is slotted so that it can be adjusted vertically in relation to the surface of the roller. This scraper prevents the dirt and mud from adhering to the roller and clogging its action. Secured to the roller-frame is a circular brace, Q, which has a series of notches in its under edge, and which extends up over the top of the bar G, as shown in Figs. 1 and 2. Upon the top of the bar G is secured the spring R, which engages with the notches in the brace so as to hold the bar G and the roller M in any desired relation to each other. When the spring is detached from the notches in the brace, the plow can be tilted toward either side until its lower edge is raised above the lower edge of the roller, as shown in dotted lines in Fig. 2, in which case the plow is supported above the ground by the roller, and then the whole apparatus is drawn along upon the roller alone. When the plow is released from its inclined position, as shown in dotted lines, the weight of the moldboard and other parts has a tendency to raise the plow into a vertical position ready for use.

The roller M will be made of any length desired, but much longer than the plow is wide, and being made to extend at right angles to the beam, one of its ends rests upon the unplowed ground, while its opposite end extends across the furrow and rests upon the freshly-plowed earth. When the earth is just thrown up, the lumps can be broken and pulverized much more readily than they can after they have become dried and hardened. As this roller runs upon the earth just as it is turned over, it breaks and pulverizes the clods in such a manner as to give the ground the appearance of having been thoroughly rolled. The length of this roller prevents any possibility of the plow upsetting, no matter whether the driver is upon the seat T or is walking along by the side of the horses. There is no necessity whatever to catch hold of the handles of the plow and hold it in the ground, except when it is desired to guide it, for the plow will operate just as well, being supported between the ground-wheel C in front and the roller behind, as though the operator had hold of the handles and was holding the point in the earth. The roller M being vertically adjustable by means of the angle-arms J, and the wheel C being vertically adjustable in the usual manner, the depth of the furrow can be regulated at will.

Bolted to the front end of the bar G are the two angle-irons U, to the top of which is secured the board V, carrying the seat T. The board V can be adjusted laterally upon the angle-irons U, so as to adjust the weight of the driver in any desired relation to the plow-beam. The driver sitting upon the seat has his feet to extend forward upon the cross-piece on the front of the beam, for the purpose of guiding the plow and causing it to make a wider or narrower furrow, as above described. The cross-bar is here shown attached to the front end of the beam as a means of steering the plow; but I do not limit myself to this exact construction, for many different devices may be used for turning the draft-hook in one direction or the other for the purpose of controlling the width of the furrow. This is a mere matter of fancy, and may be varied at will without departing from the spirit of my invention. Through the front end of the bar G is made a series of holes, X, and through the plow-beam is made a corresponding series of holes. The pivotal bolt Y can be changed from any one of the holes in the bar and beam, as may be desired, for the purpose of throwing more or less of the driver's weight upon the plow. If the ground is not hard, the clamping-bolt Y will be moved to the front holes, and then the weight of the driver comes to the rear of the pivotal bolt, and hence is exerted more upon the roller than upon the plow. If the ground is hard and stony, the bolt Y is changed backward into the rear holes, and then the weight of the driver comes more directly over the bolt and is transferred from the roller to the plow.

In case it is desired to use the plow without the attachment here shown, it is only necessary to remove the pivotal bolt Y and free the hooks I, when the whole attachment is freed from the plow at once.

My attachment can be applied to any plow now in use which is provided with a ground-wheel near the front of its beam, and which has one or more holes made through its beam, so as to correspond to the hole or holes in the bar G. Angle-irons and hooks will have to be attached then to the handles, and the plow is at once transformed from an ordinary walking-plow to a sulky and roller plow, which cannot be easily upset, and upon which the driver can ride or not, as he sees fit, while the plow is in operation.

As above stated, it is not necessary for the driver to walk behind the plow and guide by means of its handles, as he is compelled to do with an ordinary walking-plow, but can walk along by the side of the plow and guide the horses, and the plow will continue in the ground and do its work just as perfectly as though he were riding or guiding from behind.

Having thus described my invention, I claim—

1. The combination of a plow, the bar G, pivoted at its front end to the side of the plow-beam and extending backward in a line parallel therewith, with a roller which extends at right angles to the beam and bar, and which is loosely connected to the under side of the bar, substantially as described.

2. The combination of a plow, a bar, G, pivoted thereto at its front end and extending backward parallel therewith, with a roller connected to the bar, and which extends beyond both sides of the plow, so as to run upon both the plowed and unplowed ground, substantially as set forth.

3. The combination of the plow having a ground-wheel connected to its beam, the bar G, and the roller pivoted to the bar at right angles to the beam of the plow, whereby the wheel and the roller are made to regulate the depth of the furrow or support the plow above the ground, substantially as specified.

4. The combination of the plow, the bar pivoted thereto, the roller-frame provided with a roller and a notched brace, and a spring or catch on the bar for engaging with the brace, substantially as shown.

5. The combination of the plow, the draft-hook upon the front end of its beam, and a means, substantially as shown, for turning the draft-hook in different directions, the ground-wheel, the bar pivoted to the plow and provided with a seat for the driver, and the roller placed at right angles to the beam of the plow, substantially as described.

6. The combination of the plow provided with handles and the ground-wheel with the bar pivoted to the beam of the plow, the roller-frame carrying a roller, and hooks for connecting the frame to the handles, substantially as set forth.

7. The combination of the plow, the ground-wheel connected thereto, the cross-bar carrying the draft-hook pivoted upon the front end of the beam, and which is moved by the driver's feet, the bar pivoted to the plow-beam, the driver's seat connected to the bar, and the roller connected to the rear end of the bar and placed at right angles to the beam of the plow, substantially as specified.

In testimony whereof I affix my signature in presence of two witnesses.

WM. E. BUDD.

Witnesses:
F. A. LEHMANN,
L. L. BURKET.